United States Patent
Gunjan et al.

(10) Patent No.: US 9,454,782 B2
(45) Date of Patent: Sep. 27, 2016

(54) SYSTEMS AND METHODS FOR PROVIDING PRODUCT RECOMMENDATIONS

(71) Applicant: Wipro Limited, Bangalore (IN)

(72) Inventors: Abhishek Gunjan, Nutan Nagar Gava (IN); Shilpa Gopinath, Trivandrum (IN)

(73) Assignee: Wipro Limited, Bangalore (IN)

(*) Notice: Subject to any disclaimer, the term of this patent is extended or adjusted under 35 U.S.C. 154(b) by 11 days.

(21) Appl. No.: 14/577,643

(22) Filed: Dec. 19, 2014

(65) Prior Publication Data

US 2016/0086250 A1 Mar. 24, 2016

(30) Foreign Application Priority Data

Sep. 24, 2014 (IN) ............ 4658/CHE/2014

(51) Int. Cl.
G06Q 30/06 (2012.01)
(52) U.S. Cl.
CPC ................ G06Q 30/0631 (2013.01)
(58) Field of Classification Search
CPC .......... G06Q 30/0631; G06Q 30/0202
See application file for complete search history.

(56) References Cited

U.S. PATENT DOCUMENTS

2013/0204739 A1* 8/2013 Friedman .......... G06Q 30/0631
705/26.7

* cited by examiner

*Primary Examiner* — Kristy A Haupt
(74) *Attorney, Agent, or Firm* — LeClairRyan, a Professional Corporation

(57) ABSTRACT

Apparatuses, methods, and non-transitory computer readable medium that provide recommendations include determining personality traits of a sender and a recipient by applying a five-factor model to a plurality of datasets. Further, the method comprises associating a personality-product score with each of a plurality of products based on the personality traits and performing a need analysis on the user data to determine desired products from amongst the plurality of products. Further, the method comprises determining a multidimensional collaborative matrix by aggregating the personality traits, the personality-product score, the desired products, and product psychographic portfolio. Further, the method comprises determining an affinity score for at least one of the sender and the recipient towards each of the plurality of products based on the multidimensional collaborative matrix and recommending at least one product from amongst the plurality of products to the sender based on the affinity score.

21 Claims, 6 Drawing Sheets

SYSTEMS AND METHODS FOR PROVIDING PRODUCT RECOMMENDATIONS

This application claims the benefit of Indian Patent Application No. 4658/CHE/2014 filed Sep. 24, 2014, which is hereby incorporated by reference in its entirety.

FIELD

This technology relates to recommender systems, and, particularly but not exclusively, to systems and methods for providing product recommendations.

BACKGROUND

Nowadays recommendation systems have become so common that they are used in various applications, such as products, articles, movies, songs, and books for making recommendation to users. Product recommendation systems are generally implemented with e-commerce websites to recommend products that are available on an e-commerce website and suit user requirements. To recommend products to a user, the product recommend systems may use various filtering techniques, such as collaborative filtering, content-based filtering, and hybrid filtering which is combination of the collaborative filtering and the content-based filtering. In the collaborative filtering, behavior of the user is monitored and analyzed to recommend products. Some product recommendation systems may also consider behavior of other users who have similar traits or characteristics to the user under consideration. In the content-based filtering, historical browsing history of the user may be considered to make product recommendations. In the hybrid filtering, the product recommendation systems may employ both the techniques to make accurate product recommendations.

SUMMARY

Disclosed herein are systems and methods for providing product recommendations. In one example, the system comprises a processor, a memory communicatively coupled to the processor, wherein the memory stores processor-executable instructions, which, on execution, cause the processor to determine personality traits of a sender and a recipient by applying a five-factor model to a plurality of datasets obtained from user data. The processor-executable instructions, on execution, further cause the processor to associate a personality-product score with each of a plurality of products based on the personality traits. The processor-executable instructions, on execution, further cause the processor to perform a need analysis on the user data to determine desired products from amongst the plurality of products. The processor-executable instructions, on execution, further cause the processor to determine a multidimensional collaborative matrix by aggregating the personality traits of the sender and the recipient, the personality-product score, the desired products, and product psychographic portfolio. The product psychographic portfolio comprises elasticity of affinity toward each of the plurality of products with respect to the personality traits of the sender and the recipient. The processor-executable instructions, on execution, further cause the processor to determine an affinity score for at least one of the sender and the recipient towards each of the plurality of products based on the multidimensional collaborative matrix. The processor-executable instructions, on execution, further cause the processor to recommend at least one product from amongst the plurality of products to the sender based on the affinity score.

Certain embodiments of the present disclosure relates to a method for providing product recommendations comprises determining personality traits of a sender and a recipient by applying a five-factor model to a plurality of datasets obtained from user data. Further, the method comprises associating a personality-product score with each of a plurality of products based on the personality traits. Further, the method comprises performing a need analysis on the user data to determine desired products from amongst the plurality of products. Further, the method comprises determining a multidimensional collaborative matrix by aggregating the personality traits of the sender and the recipient, the personality-product score, the desired products, and product psychographic portfolio. The product psychographic portfolio comprises elasticity of affinity toward each of the plurality of products with respect to the personality traits of the sender and the recipient. Further, the method comprises determining an affinity score for at least one of the sender and the recipient towards each of the plurality of products based on the multidimensional collaborative matrix. Further, the method comprises recommending at least one product from amongst the plurality of products to the sender based on the affinity score.

Certain embodiments of the present disclosure also relate to a non-transitory, computer-readable medium storing instructions for providing product recommendations that, when executed by a processor, cause the processor to perform operations comprising determining personality traits of the sender and a recipient by applying a five-factor model to a plurality of datasets obtained from user data. Further, the operations comprise associating a personality-product score with each of a plurality of products based on the personality traits. Further, the operations comprise performing a need analysis on the user data to determine desired products from amongst the plurality of products. Further, the operations comprise determining a multidimensional collaborative matrix by aggregating the personality traits of the sender and the recipient, the personality-product score, the desired products, and product psychographic portfolio. The product psychographic portfolio comprises elasticity of affinity toward each of the plurality of products with respect to the personality traits of the sender and the recipient. Further, the operations comprise determining an affinity score for at least one of the sender and the recipient towards each of the plurality of products based on the multidimensional collaborative matrix. Further, the operations comprise recommending at least one product from amongst the plurality of products to the sender based on the affinity score.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1A:
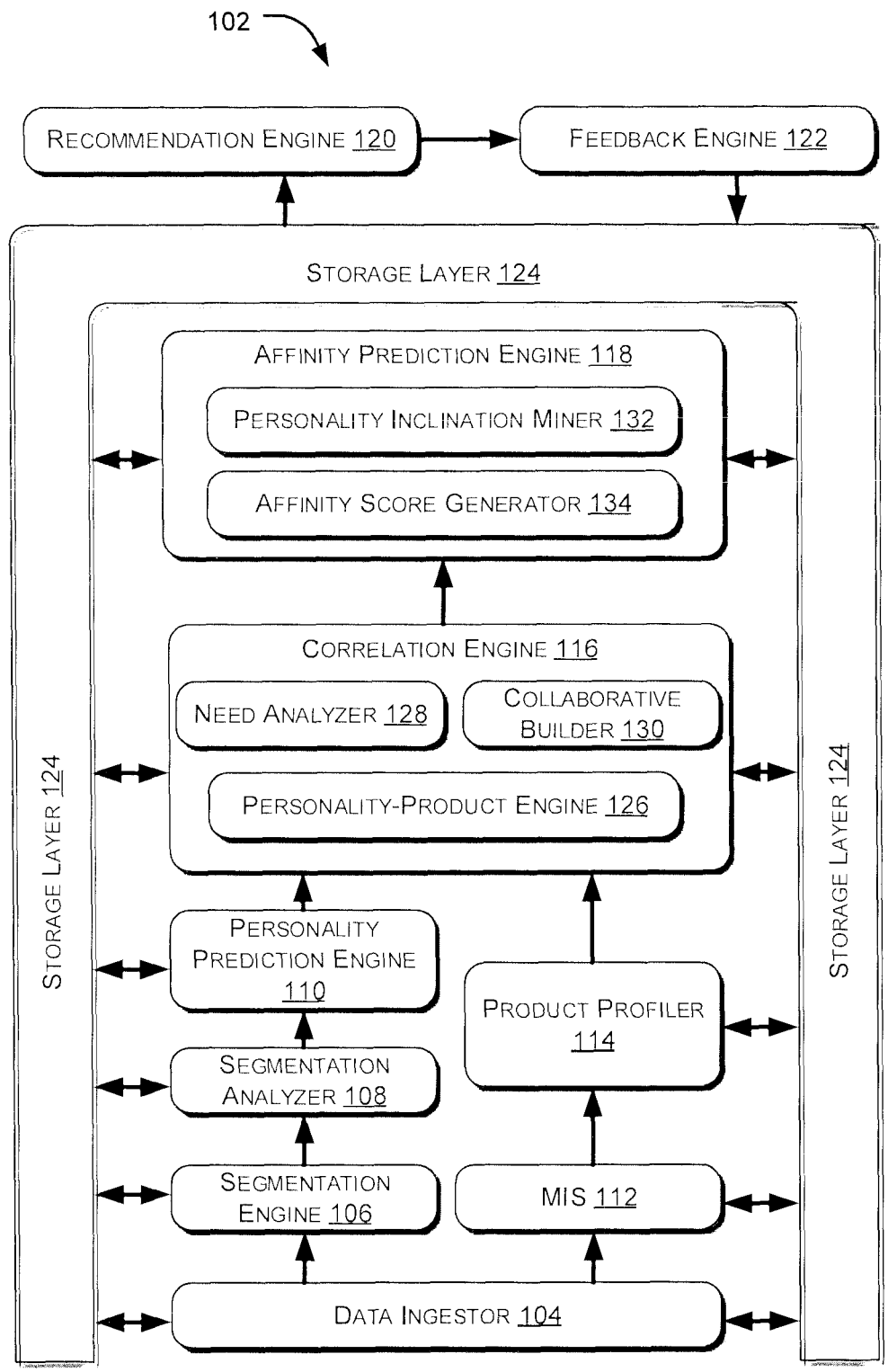
FIG. 1(a) illustrates a block diagram of a high-level architecture of an exemplary product recommendation system, in accordance with some examples of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Generally, conventional recommender systems are addressed to a single user accessing an application. Recommendations from such recommender systems are not useful when a person, referred to as a sender, wants to buy a product or avail a service for another person, referred to as a recipient. In other words, the conventional recommender systems may not be able to recommend products accurately when the product is an entity of exchange between two persons. Some of the conventional recommender systems may use sender's information and rely on sender's judgments about preferences of the recipient for making the recommendations.

Also, in scenario of gifting of a product, the conventional recommender systems may not consider type and strength of relation existing between the sender and the recipient. Further, since the conventional recommender systems do not consider possible occurrence of coincidence and diversity in the receipt of gifts with the conventional recommender system, the recipient may receive similar gifts from multiple senders.

The present subject matter discloses systems and methods for providing product recommendations. The systems and methods may be implemented in a variety of computing systems. The computing systems that can implement the described method(s) include, but are not limited to a server, a desktop personal computer, a notebook or a portable computer, and a mainframe computer. Although the description herein is with reference to certain computing systems, the systems and methods may be implemented in other computing systems, albeit with a few variations, as will be understood by a person skilled in the art.

Apparatuses, methods, and non-transitory computer readable media of the present subject matter provide improved product recommendations by considering a third person perspective for recommendations. The present subject matter uses personality elasticity coefficients of products with a five-factor model for determining personality traits of a sender and a recipient. The present subject matter aggregates correlated elements, such as motivation of transaction, product psychographic portfolio, sender and recipient profiles and their interpersonal relationship, past transactions between them, and affinity towards products.

Further, the present subject matter co-ordinates with inventory manager 168, to derive the product entities to be pushed or pulled during the recommendation process. It provides sellers with a framework which enables incorporation of their business strategies into the recommender system. Also, affinity to certain products may depend greatly on certain personality traits, whereas affinity towards some others may remain more or less the same. The systems and methods of present subject matter leverage this difference in personality elasticity of products to favor less-favorite products. The personality elasticity of products may be understood as elasticity of affinity towards products with respect to a personality profile of the sender and/or the recipient.

Working of the apparatuses, methods, and non-transitory computer readable media that provide product recommendations is described by way of examples in conjunction with FIGS. 1(a)-4. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1(a) illustrates a block diagram of a high-level architecture of an exemplary product recommendation system 102, in accordance with some examples of the present disclosure, such as the product recommendation computing apparatus 401. The product recommendation system 102, such as by way of example only the product recommendation computing apparatus 401 illustrated in FIG. 4 and hereinafter may be interchangeably referred to as a system 102, comprises a data ingestor 104, a segmentation engine 106, a segmentation analyzer 108, a personality prediction engine 110, a management information system (MIS) 112, a product profiler 114, a correlation engine 116, an affinity prediction engine 118, a recommendation engine 120, a feedback engine 122, and a storage layer 124.

Further, as shown in FIG. 1(a), the correlation engine 116 and the affinity prediction engine 118 comprise sub-modules. The correlation engine 116 comprises a personality-product engine 126, a need analyzer 128, and a collaborative builder 130. The affinity prediction engine 118 comprises a personality inclination miner 132 and an affinity score generator 134.

In operations, to provide product recommendations to a sender considering a perspective of a recipient also, the data ingestor 104 may receive user data from at least one data source to determine personality or characteristics of the sender and the recipient. The user data may include information related to the sender and the recipient, such as age, gender, relation between the sender and the recipient, occasion, upcoming events, behavior, past browsing history, social profile feeds, and personal preferences.

In one example, the data ingestor 104 may comprise multiple adapters and listeners to continuously listen to the user data from different sources. The user data may be further analyzed based on parameters, such as demography, occasion, gender, age group, and relation type to determine a plurality of products suitable for the recommendations.

As shown in FIG. 1(a), there are multiple channels to direct flow of data to the storage layer 124. In an example, the storage layer 124 may be used for storing the user received by the system 102 and any other data generated during the product recommendations.

Figure 1B:
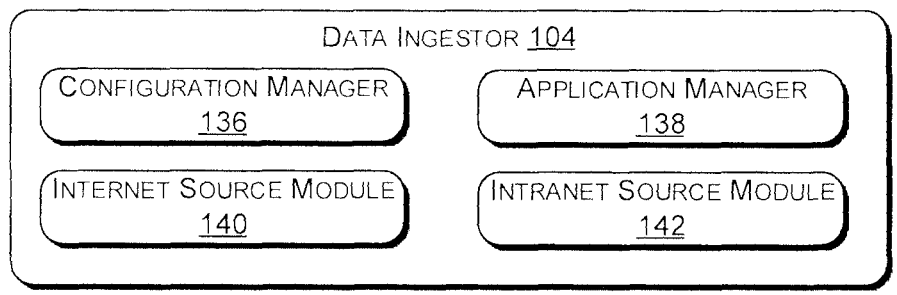
FIG. 1(b) illustrates components of a data ingestor of the product recommendation system, in accordance with some examples of the present disclosure.

FIG. 1(b) illustrates components of the data ingestor 104 of the product recommendation system 102, in accordance with some examples of the present disclosure. The data ingestor 104 comprises a configuration manager 136, an application manager 138, internet source module 140, and intranet source module 142.

The configuration manager 136 may allow a user to configure various parameters, such as occasion, gender, demography, relationship type, and strength. The configuration manager 136 may enable the user to select fields in the user data that may include relevant information for processing. Further, the configuration manager 136 may specify time periods needed for specific analysis components, such as number of days of information to be mined for occasion analysis and number of months of data to be processed for personality prediction. The configuration manager 136 may allow the user to configure inputs dedicated to changing business goals, decisions, strategies and vision, which may help in analyzing information present in the MIS 112.

The application manager 138 may create a platform to receive user's consent for mining of additional information regarding him/her from sources like social media profiles and feeds. The application manager 138 may collect information, such as interaction between users linked/connected on social media, family tree, recent likes, conversation history, areas of interest, location, recent posts/updates/queries, communities followed or belonging to, pages liked, advertisements browsed. The platform may also have customized privacy settings that expands purchasers' network through inviting friends. In one example, the application manager 138 may also be used to schedule gifts, share feedback on products and customer experience.

The intranet source module 142 may listen for data from multiple databases. After listening to relevant information, the intranet source module 142 may perform data distribution analysis to find out whether the provided information is sufficient enough to perform analysis or not. The intranet source module 142 may also indicate information that is incomplete to the user. Further, upon performing the data distribution analysis, the intranet source module 142 may perform a correlation analysis to build a full lifecycle of a transaction.

The internet source module 140 may listen for data from multiple social media sources from various social media websites. The user data may be extracted through usage of crawlers, and application programming interface (API) services. Once the user data is obtained, the internet source module 140 may perform data filtration. Then, the internet source module 140 may determine what all information is useful for analytics and building 360 degree profile of the sender and the recipient.

Further, the segmentation engine 106 may segment the user data received based on segmentation rules to obtain a plurality of datasets. The segmentation has been explained in details in conjunction with FIGS. 1(c) and (d).

Figure 1C:
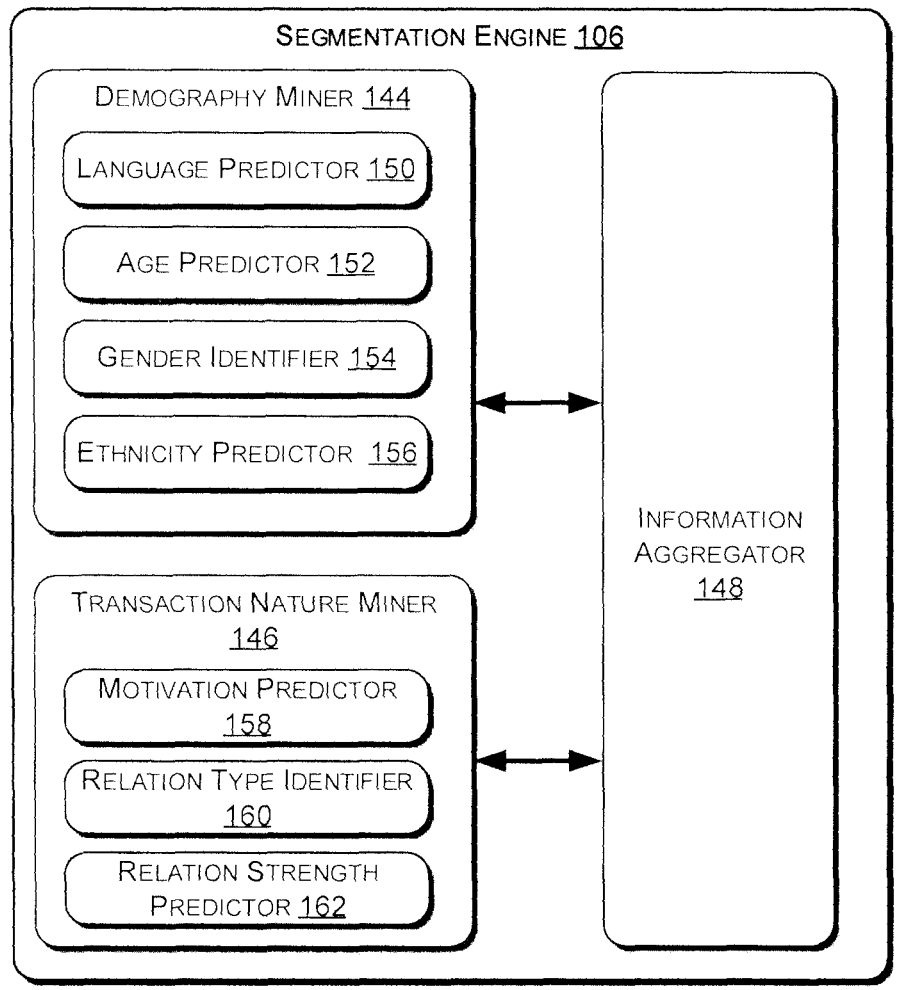
FIG. 1(c) illustrates components of a segmentation engine of the product recommendation system, in accordance with some examples of the present disclosure.

FIG. 1(c) illustrates components of segmentation engine 106 of the product recommendation system 102, in accordance with some examples of the present disclosure. As shown in FIG. 1(c), the segmentation engine 106 comprises a demography miner 144, a transaction nature miner 146, and an information aggregator 148. The demography miner 144 further comprises sub-modules, such as a language predictor 150, an age predictor 152, a gender identifier 154, and an ethnicity predictor 156.

The language predictor 150 may use libraries to identify language of text present in the user data. Identification of user's language may help in understanding user preferences based on demography and language/culture differentiation. The age predictor 152 employs various techniques to determine age of the user. The techniques may include analyzing images, social profile, and education/job profile. The gender identifier 154 may employ similar technique to determine gender of the user. Further, the ethnicity predictor 156 may identify ethnicity of the user by using image processing techniques on facial images of the user. In an example, if ethnicity of the user is explicitly known, then ethnicity determined through the image processing techniques may be validated using known result, which may be then utilized to improve accuracy of the ethnicity predictor 156.

Further, the transaction nature miner 146 comprises sub-modules, such as a motivation predictor 158, a relation type identifier 160, and a relation strength predictor 162. The motivation predictor 158 may identify motivation behind purchasing a product for the recipient. In an example, to identify the motivation, the motivation predictor 158 may build taxonomy of all events/occasions important for the recipient. Then, the motivation predictor 158 may capture social media insights of the recipient from past few weeks/months. In case there is no specific occasion, the motivation predictor 158 may suggest forthcoming events or calendar occasions. The relation type identifier 160 may identify relation type between the sender and the recipient. The relation type could be formal, informal or even a blood relation. The relation type predictor may identify the relation type by analyzing family tree information, present ages of sender and recipient, age difference between them, membership in groups/communities, occupation, information on mutual friends/connections, conversation history, relationship status, and tagging to updates. The relation strength predictor 162 is based on a scoring model which accounts for factors like frequency, timing and kind of mutual interaction on internet platforms, commonality in location or occupation or common communities, commonality in tagging, images or videos of them occurring together, and so on. The strength of bonding has a potential to influence quality and cost of items of potential purchase.

Once information from the demography miner 144 and the transaction nature miner 146 obtained, the information aggregator 148 may aggregate the information. In an example, the information aggregator 148 may store the aggregated information in the form of multi-dimensional cubes where entities, such as occasion, age, gender, and relationship type are treated as dimensions. Each cube may comprise segment of information about people who fall at the intersection of n dimensions. In one example, dynamic hierarchy may be based on configuration settings specified by the configuration manager 136.

Further, the segmentation analyzer 108 may assimilate information from an existing transaction data pool and data cubes conceived by the segmentation engine 106. The transaction analyzer may analyze past occurrences of transactions. In an example, the transactions involving people belonging to specific age group, gender, ethnicity and language in the event of particular events/occasions, are separately identified by the transaction analyzer based on mode of involvement being as the sender or the recipient. In both the modes, the products transacted are associated or tagged separately onto the corresponding segment of the data cube. In this manner, the plurality of datasets in the form of data cubes is obtained.

Thereafter, the personality prediction engine 110 may determine personality traits of the sender and the recipient by applying a five-factor model to the plurality of datasets. Working of personality prediction engine 110 is discussed in conjunction with FIG. 1(d).

Figure 1D:
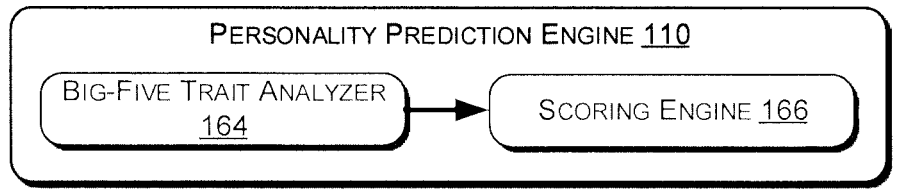
FIG. 1(d) illustrates components of a personality prediction engine of the product recommendation system, in accordance with some examples of the present disclosure.

FIG. 1(d) illustrates components of the personality prediction engine 110 of the product recommendation system 102, in accordance with some examples of the present disclosure. The personality prediction engine 110 comprises a big-five trait analyzer 164 and a scoring engine 166. In an example, the big-five trait analyzer 164 may retrieve the plurality of datasets pertaining to the sender and the recipient. The big-five trait analyzer 164 may analyze the plurality of datasets, based on a five-factor model, to determine inclination of the sender and the recipient against each of the personality traits.

Thereafter, the scoring engine 166 may compute a score for each of the personality traits. In an example, the scoring engine 166 may then assign a predefined weight to multiple objective and subjective factors which can be meaningful to assess a personality trait. Further, during computation of an aggregate score, the scoring engine 166 may perform normalization based on the variation of scores for all personality traits of the sender and the recipient. Furthermore, the scoring engine 166 may perform a second level of normalization based on scores of all users in a repository maintained by the system 102. The scoring engine 166 may then represent the scores assigned to the personality traits on a common scale, which provides a common platform for comparison. In this manner, personality traits of the sender and the recipient are identified and represented on the common scale.

Further, in process of the product recommendation, the system 102 may also coordinate with the MIS 112 to determine products that are to be pushed or pulled during the recommendation manner. This allows a seller to incorporate business strategies into the system 102. Working of the MIS 112 is discussed in conjunction with FIG. 1(e).

Figure 1E:
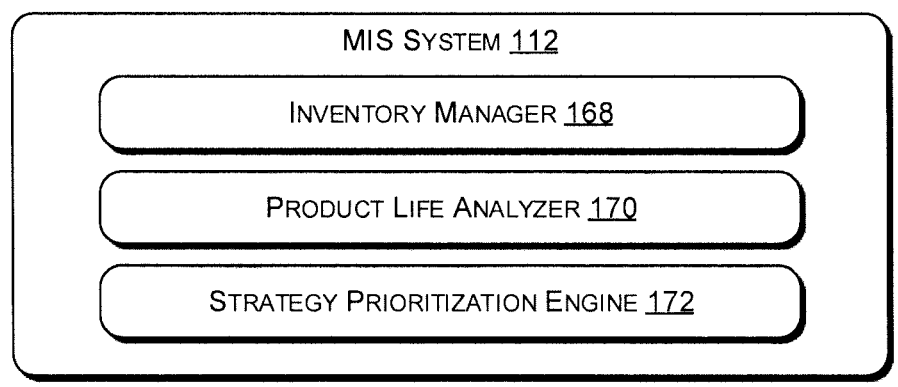
FIG. 1(e) illustrates components of a management information system (MIS) of the product recommendation system, in accordance with some examples of the present disclosure.
Figure 1F:
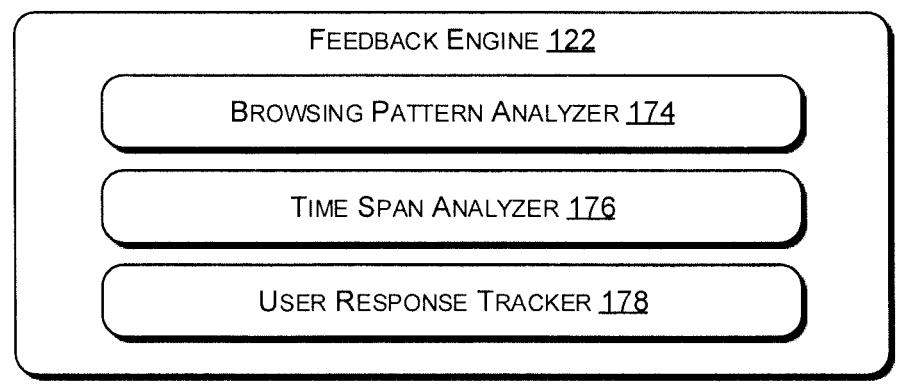
FIG. 1(f) illustrates components of a feedback engine of the system, in accordance with some examples of the present disclosure.

FIG. 1(e) illustrates components of the MIS 112 of the product recommendation system 102, in accordance with some examples of the present disclosure. The MIS 112 comprises an inventory manager 168, a product life analyzer 170, and a strategy prioritization engine 172. The inventory manager 168 may perform functions of inventory management and store information regarding in-store and out-stores movement of goods. The product life analyzer 170 may keep status of a product along with other attributes, such as product lifecycle, product categorization, and acceptance and stability of products in market. The strategy prioritization engine 172 manages business strategies with changing business goals, plans, decisions and external conditions. Further, the strategy prioritization engine 172 may provide inputs, related to priority incorporating business strategies, to the affinity prediction engine 118. Based on the above factors, i.e., inventory, product lifecycle, and priority, the MIS 112 may prepare a product list having products with high priority so that the recommendations also take care of seller's interest.

The product profiler 114 may determine product psychographic portfolio comprising elasticity of affinity towards each of the plurality of products with respect to the personality traits of the sender and the recipient. It may be noted that affinity to certain products may depend greatly on certain personality traits, whereas affinity towards some others may remain more or less the same.

The product profiler 114 determines the product psychographic portfolio through a product-centered personality profiling. In an example, the product profiler 114 may plot count of persons, who are positive towards a product, against their corresponding scores for all the five personality traits in a multi-dimensional space. In such plots, higher count of persons may indicate affinity towards a product. Also, a surface, comprising highest values of affinity found corresponding to each combination of personality scores, may be modeled to capture interdependence of the big-five personality traits. For a particular product, the product profiler 114 may compute mean value of personality scores for each the personality traits of all persons who exhibited affinity towards the product. At this specific point on the surface, partial differentiation with respect to each axis of personality trait may be carried out to determine a big-five elasticity coefficient for each personality trait. The big-five elasticity coefficient of a personality trait represents difference or variation in the affinity towards product with respect to variation in that personality trait. The value of elasticity of a product with respect to a personality trait is higher, if a difference in personality trait is significant in causing a variation in the affinity towards that particular product. Similarly, the product profiler 114 may also generate set of big-five elasticity coefficients for each product, which may be further normalized with respect to the entire product database. In an example, the set of big-five elasticity coefficients and the product list received from the MIS 112 may be used to obtain the product psychographic portfolio. In this manner, product profiler 114 may determine the product psychographic portfolio.

Further, since offering or gifting of a product between two entities inherently carries a signature of both, the sender and the recipient, the product profiler 114 may determine the product psychographic portfolio of certain products in two modes, i.e., one is created considering the big-five personality trait scores of the senders of the product alone, and the other is created with regard to the recipient. Thereby, a certain product may have two sets of big-five elasticity coefficients associated with it, one for the sender and the other for the recipient.

Thereafter, the correlation engine 116 may aggregate information received from the segmentation analyzer 108 and the product profiler 114, such as motivation of transaction, the product psychographic portfolio, sender and recipient profiles and their interpersonal relationship, and the past transactions. The correlation engine 116 also receives inputs from the personality-product engine 126 and the need analyzer 128.

The personality-product engine 126 may determine a personality-product score for each of the plurality of products based on the personality traits. In an example, the personality-product engine 126 may associate the personality-product score with the each of the plurality of products. The personality-product score may indicate a relative preference, if any, assigned to a product based on the personality traits. In an example, the personality-product engine 126 may compute the personality-product score using a rule-based model, based on configurations settings present with the configuration manager 136, or with the aid of a classifier created using the historical transactions. Thus, the personality-product engine 126 performs a compatibility check to assess acceptance of a product in terms of its attributes other than psychographic profiling, given user's personality attributes. For instance, a newly launched product shall be recommended to users with a preference for novelty and variety, whereas a well-established product can be offered to a user who prefers a planned approach.

The need analyzer 128 may perform a need analysis on the user data to determine desired products from amongst the plurality of products. The need analyzer 128 may keep track of needs implicitly or explicitly expressed by the sender and the recipient. In an example, the need analyzer 128 may identify the need from varied sources, such as products added to wish lists or carts, intent of buying discussed in conversation history, recent likes, browsing pattern and time spent on products, advertisements browsed, recently posted queries, related transactions carried out, and participation in groups/communities/forum. In this manner, the need analyzer 128 may take care of situations where items are already purchased by the sender/recipient for self or received by him/her as a gift. Thereby, eliminating possibility of a person receiving multiple similar gifts. Consequently, a set of products from amongst the plurality of products are identified as the desired products by the need analyzer 128.

Once the personality traits of the sender and the recipient, the personality-product score, the desired products, and psychographic product portfolio are available, the collaborative builder 130 may aggregate all of them together to obtain a multidimensional collaborative matrix.

In an example, at a unit cube formed by intersection of all dimensions, lies set of people belonging to specific age group, gender, ethnicity, location and language, the products sent and received by them, in the event of particular events/occasions, and relationship of a specific type and strength. The collaborative builder 130 may link information regarding personality types of people involved and their recent needs implicitly or explicitly expressed and captured by the need analyzer 128, product profiles built based on the product psychographic portfolio and other relevant attributes, personality-product score, and product prioritization given by the MIS 112. Thus, the collaborative builder 130 determines the multidimensional collaborative matrix.

Subsequently, the affinity prediction engine 118 may evaluate suitability of the products for recommendation based on the multidimensional collaborative matrix and a feedback, received by the feedback engine 122, from the sender. The affinity prediction engine 118 may evaluate the suitability by determining an affinity score for the sender and the recipient towards each of the plurality of products.

To determine the affinity towards a product, the personality inclination miner 132 may fetch the two sets of big-five elasticity coefficients, one for the sender and the other for the recipient. Then, the personality inclination miner 132 may determine change in product affinity of the sender and the recipient towards a product, based on the general benchmark of the personality trait scores computed by the product profiler 114. In an example, the determination of increased/decreased product affinity may be undertaken for the sender and the recipient separately by using their corresponding personality scores and big-five elasticity coefficients.

The big-five elasticity coefficients computed by the product profiler 114 may contribute to the suitability of a product, on the basis of the personality traits and uniformity or skewness in the significance values of personality traits favoring the product. The personality inclination miner 132 may leverage the difference in personality elasticity of products to favor less-favored products. In an example, larger the elasticity coefficient value, larger is the variation in product affinity with personality trait variation, and larger is the significance of that trait. For a particular product, computation of change or variation in the affinity by the personality inclination miner 132 is provided below.

In an example, the affinity may be expressed as a function of personality scores of users in existing database and incoming new user as shown in Equation 1.

$$\text{Affinity Score } (A)=f(O,C,E,A,N) \quad \text{Equation 1}$$

Where O (openness), C (conscientiousness), E (extraversion), A (agreeableness), and N (neuroticism) are the personality traits.

The personality inclination miner 132 may compute mean value of personality scores for each of the personality traits for all users, present in the repository, who exhibited affinity towards the product. The mean value of the personality traits may be represented as (Od, Cd, Ed, Ad, Nd).

Then, the personality scores may be computed for a new user considered for the analysis and the personality scores are represented as (Ou, Cu, Eu, Au, Nu).

Thereafter, change or variation in the affinity value (dA) between the new user and the users who have exhibited affinity towards the product is calculated using Equation 2.

$$dA = \epsilon o(Ou-Od) + \epsilon c(Cu-Cd) + \epsilon e(Eu-Ed) + \epsilon a(Au-Ad) + \epsilon n(Nu-Nd) \quad \text{Equation 2}$$

Where ($\epsilon o$, $\epsilon c$, $\epsilon e$, $\epsilon a$, $\epsilon n$) are the big-five elasticity coefficients computed at the point (Od, Cd, Ed, Ad, Nd) on the surface modelled.

In an example, big-five elasticity coefficient for a personality trait, such as openness ($\epsilon o$) may be equal to partial derivative of a function (f) with respect to the trait (O).

Further, higher the value of dA, the greater is the affinity of the user of interest towards the product. Determination of the change in the affinity helps in attributing more weightage to smaller variations in trait of a person from the general benchmark, if the trait is significant. The affinity of a user towards a product indicates whether the product is suitable for recommending to the user. This tactics checks the system 102 from overlooking an opportunity to suggest a product appealing to lesser number of personality categories while recommending a generally liked product. For example, a 'hit' for a popular product should not be at the opportunity cost of a 'hit' for a lesser-favorited one. This enhancement is attributed to understanding of the range of personality profiles a product may cater to, by analysis of variation of product affinity with respect to variation in personality traits.

Further, the affinity score generator 134 may compute the affinity score for the sender and the recipient towards the products and the associate the affinity score with the sender and recipient. In an example, depending on the nature and functionaries of the impending transaction, this affinity score generator 134 may generate a list of tentative products for recommendation and prioritizes them by computing the aggregate affinity score for each, as per the configuration settings in the configuration manager 136. Thereafter, depending upon the affinity score of the sender and recipient, the affinity score generator 134 may shortlist the products from amongst the plurality of products that are likely to be recommended to persons who are similar to a recipient and are likely to be bought for others by persons similar to the sender. The product may be then added to a list of tentative products for recommendation.

Thereafter, the affinity prediction engine 118 may prioritize the products based on the affinity score and inputs received from the need analyzer 128, the personality-product engine 126, and the personality inclination miner 132. In an example, the need analyzer 128 may give directive on the list of items needed by the recipient which fall within the purchasing power of the sender. The personality-product engine 126 may provide information on product acceptance levels of users depending on the correlation between user's personality traits and product attributes like its stability or status in market. The personality inclination miner 132 may provide information on increased or decreased product affinity determined for both sender and recipient separately, by using their corresponding personality scores and the big-five elasticity coefficients. The affinity prediction engine 118 may calculate the affinity score by performing statistical aggregation operations on the scores awarded by the components, such as the need analyzer 128, the personality-product engine 126, and the personality inclination miner 132.

The recommendation engine 120 may then provide real-time recommendation to customers based on the affinity score. The prediction engine may employ fast queuing mechanism to queue all user requests and then with the help of horizontally scalable worker nodes performs the recommendation to customer based on personality based on elasticity coefficient, demography, age group, gender, occasion, relationship, etc. To perform faster recommendation, the recommendation engine 120 may use multiple optimization techniques where the model is distributed, localized and pre-loaded. The recommendation engine 120 is communicatively coupled to the feedback engine 122. The feedback engine 122 captures a feedback from user which helps in improving recommendation and simultaneously helps in improving user experience.

In an example, the feedback engine 122 may track and collect user responses. The user responses may be then provided to the affinity prediction engine 118. Further, the feedback engine 122 may also capture implicit and explicit expressions of user interest and store in the storage layer 124. The expression of the user interest may be then used in determining products affinity of users.

FIG. 1(*f*) illustrates components of the feedback engine 122 of the product recommendation system 102, in accordance with some examples of the present disclosure. The feedback engine 122 comprises a browsing pattern analyzer 174, a time span analyzer 176, and a user response tracker 178. The browsing pattern analyzer 174 tracks user activities, such as browsing and clicking patterns. The browsing patter analyzer may also collect responses when the user is present with a given set of triggered recommendations. The time span analyzer 176 may track time spent by a user on each activity. The time may be then correlated with the browsing pattern to comprehend current requirements of the user and his/her intensity of inclination to products. The user response tracker 178 tracks responses of the sender and the recipient post recommendation. The user response tracker 178 may capture events, such as the sender ending up buying the suggested product, a positive review by the sender or the recipient, post-gifting conversation happening between the sender and the recipient, and activities mentioning the gift by the sender or the recipient.

Thus, the system 102 disclosed by the present subject matter is multi-dimensional and is also multi-hierarchical in nature. The system 102 may first select the dimension in different levels and then analyze the multiple hierarchies to recommend a product that meets the requirement of the user. The present subject matter adopts an integral approach encompassing motivation of exchange, the product psychographic portfolio, personality traits of the sender and the recipient, and their interpersonal relationship. Also, the system 102 may co-ordinate with the inventory manager 168, to derive the product entities to be pushed or pulled during the recommendation process. Thereby, incorporating seller strategies for catalyzing less-favorite products into the system 102.

Figure 2:
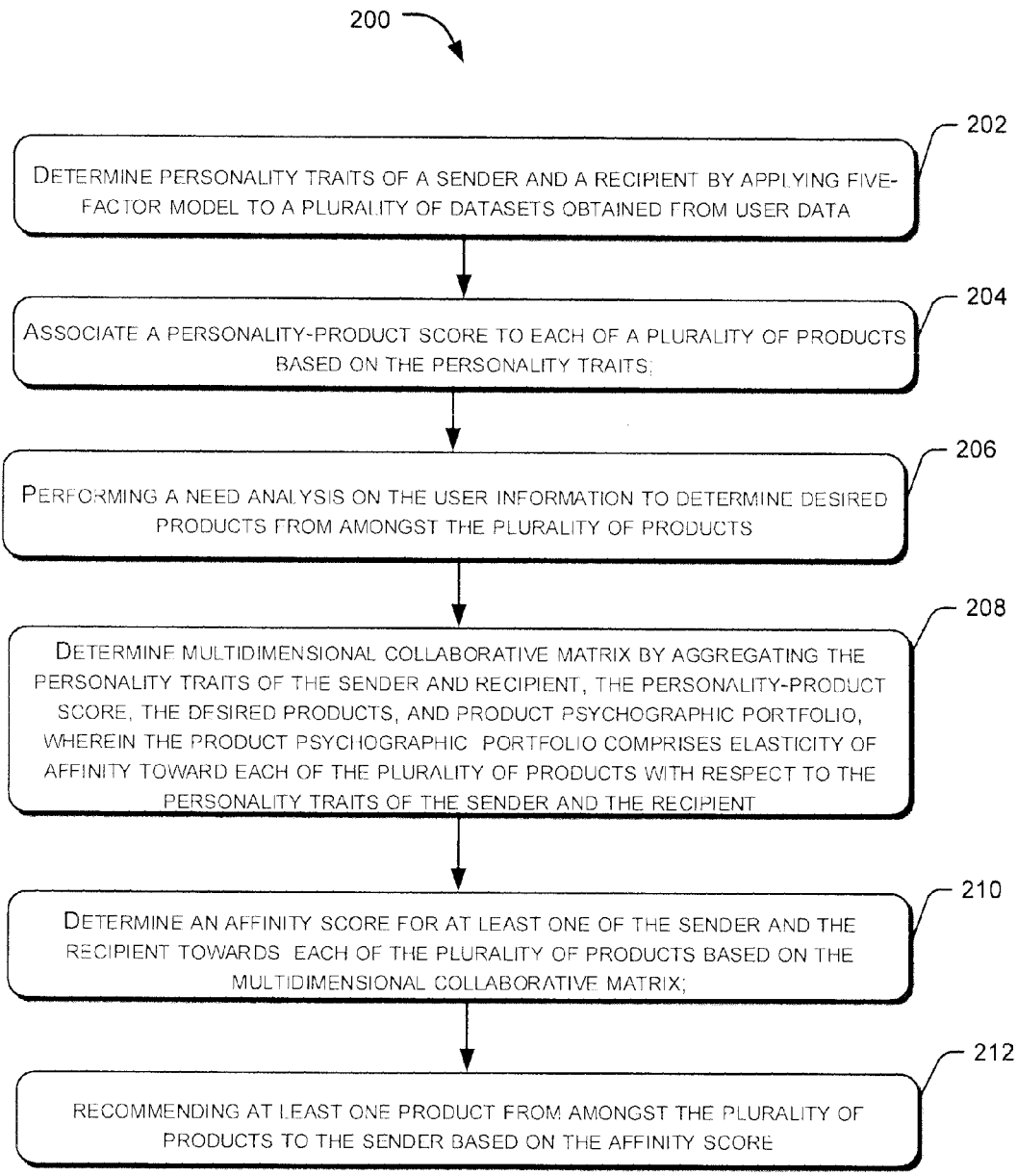
FIG. 2 illustrate an exemplary computer implemented method for providing product recommendations, in accordance with some examples of the present disclosure.

FIG. 2 illustrate exemplary computer implemented methods for providing product recommendations, according to some examples of the present disclosure.

Figure 3:
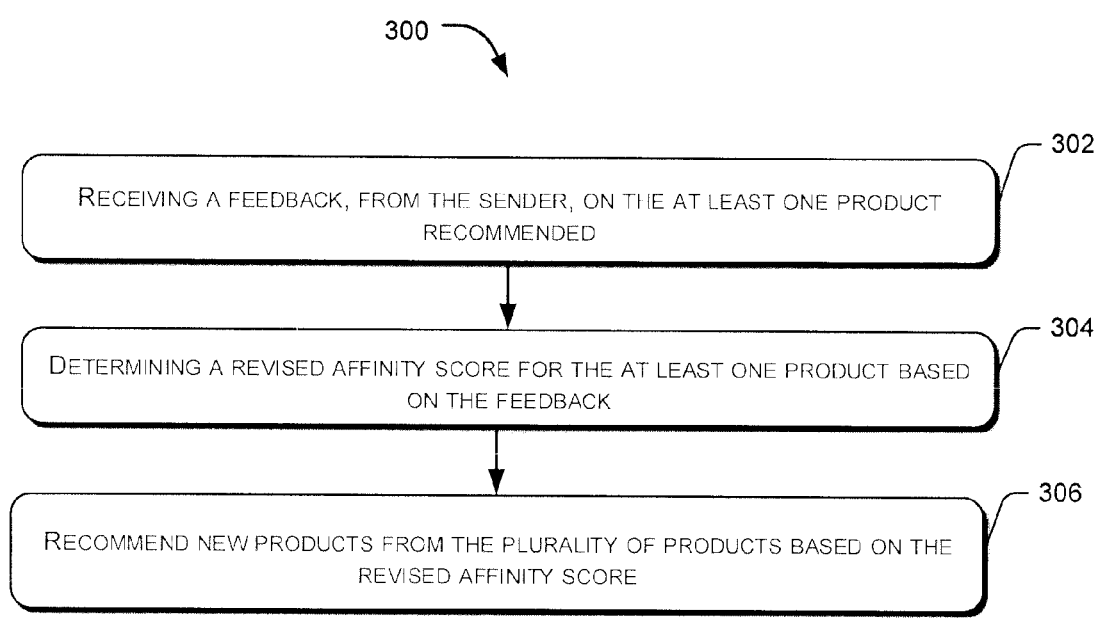
FIG. 3 illustrate an exemplary computer implemented method for improving product recommendations based on a feedback, in accordance with some examples of the present disclosure.

FIG. 3 illustrate an exemplary computer implemented method for improving product recommendations based on a user feedback, in accordance with some examples of the present disclosure.

The methods 200 and 300 may be described in the general context of computer executable instructions. Generally, computer executable instructions can include routines, programs, objects, components, data structures, procedures, modules, and functions, which perform particular functions or implement particular abstract data types. The methods 200 and 300 may also be practiced in a distributed computing environment where functions are performed by remote processing devices that are linked through a communication network. In a distributed computing environment, computer executable instructions may be located in both local and remote computer storage media, including memory storage devices.

The order in which the methods 200 and 300 are described is not intended to be construed as a limitation, and any number of the described method blocks can be combined in any order to implement the methods 200 and 300 or alternative methods. Additionally, individual blocks may be deleted from the methods 200 and 300 without departing from the spirit and scope of the subject matter described herein. Furthermore, the methods 200 and 300 can be implemented in any suitable hardware, software, firmware, or combination thereof.

With reference to method 200 as depicted in FIG. 2, as shown in step 202, personality traits of a sender and a recipient are determined by applying a five-factor model to a plurality of datasets obtained from user data. In an example, the personality prediction engine 110 may determine the personality traits by applying the five-factor model the plurality of datasets. The plurality of datasets is obtained from the user data by segmenting the user data based on the segmentation rules. Further, the user data, comprising information about the sender and the recipient, is received from at least one data source.

In an example, to validate the user data, the data ingestor 104 may initialize configuration settings. Then, the data ingestor 104 may receive the user data from the at least one data source. The at least one data source may include internal and external data sources. The data ingestor 104 may then preprocess the user data based on the configuration settings. During preprocessing, data which is sufficient to mine parameters and pertaining to the required time period of analysis may be filtered and stored in the storage layer 124. Further, the data ingestor 104 may correlate data attributes obtained from the data sources based on the preprocessing. The correlation between relevant attributes obtained from multiple sources of data is used as confirmatory check to match between the corresponding profiles of users spread across sources. Further, the data ingestor 104 may analyze correlated data attributes to validate the user data. By validation, the data ingestor 104 determines whether provided information in the user data is sufficient to perform subsequent analysis or not. The data ingestor 104 may also indicate what all information is incomplete by performing a distribution analysis.

Once the user data is received, the segmentation analyzer 108 may segment the user data, based on the segmentation rules, to obtain a plurality of datasets. In an example, the segmentation analyzer 108 may perform the segmentation of the user data, based on demographic attributes and nature of transaction, to obtain the plurality of datasets. Subsequently, the personality prediction engine 110 may apply the five-factor model to the plurality of datasets to determine the personality traits of the sender and the recipient.

At step 204, a personality-product score with each of a plurality of products is associated based on the personality traits. The personality-product score may indicate correlation of the personality traits of the sender and the recipient with lifecycle stages of the plurality of products. For instance, a newly launched product may be recommended to users that are open to novelty and variety in products. In an example, the personality-product engine 126 may determine and then associate the personality-product score with each of the plurality of products.

At step 206, a need analysis is performed on the user data to determine desired products from amongst the plurality of products. In an example, the need analyzer 128 may perform the need analysis to determine the desired products. The desired products are products that meet requirement and interest of the user. The need analyzer 128 may determine the desired products based on the information, such as products added to wish lists or shopping carts, intent of buying expressed in conversation history, recent likes, browsing pattern, and time spent on product browsing, advertisement browsed, posted queries, and participation in groups and forums discussing products.

At step 208, a multidimensional collaborative matrix is determined by aggregating the personality traits of the sender and the recipient, the personality-product score, the desired products, and the product psychographic portfolio. In an example, the collaborative builder 130 may aggregate the information, such as the personality traits of the sender and the recipient, the personality-product score, the desired products, the product psychographic portfolio, a product list obtained from MIS 112 to obtain the multidimensional collaborative matrix. The product psychographic portfolio may comprise elasticity of affinity toward each of the plurality of products with respect to the personality traits of the sender and the recipient. In an example, the product profiler 114 may determine the product psychographic portfolio based on the product list and big-five elasticity coefficients. Further, the product list comprises products with high priority in the MIS 112. In an example, the MIS 112 may help in incorporating business strategies into the system 102 so that the recommendations suit interest of the sellers also. The big-five elasticity coefficients indicate variation in affinity towards a product with respect to variation in each of the personality traits.

At step 210, an affinity score is determined for at least one of the sender and the recipient towards each of the plurality of products based on the multidimensional collaborative matrix. In an example, the affinity prediction engine 118 may receive inputs from the need analyzer 128, the personality-product engine 126, and the personality inclination miner. The inputs may comprise various scores, such as score indicating need, the personality-product score, and the affinity towards the products. The affinity prediction engine 118 may perform statistical aggregation operations on the inputs to determine the affinity score for both the sender and the recipient towards each of the plurality of products.

At step 212, at least one product from amongst the plurality of products is recommended to the sender based on the affinity score. In an example, the recommendation engine 120 may recommend the products based on the affinity score of the sender and the recipient towards the products. The recommendation engine 120 may receive a feedback from the feedback engine 122. The feedback may indicate user experience with the recommendations and whether the user actually buys the recommended product. Further, the feedback engine 122 may monitor responses received from the sender and the recipient post-recommendation also to improve further recommendations.

With reference to method 300 as depicted in FIG. 3, as shown in step 302, the feedback, on the at least one product recommended, is received from the sender. In an example, the feedback engine 122 may monitor user response to determine the feedback.

At step 304, a revised affinity score for the at least one product is determined based on the feedback. In an example, upon receiving the feedback, the feedback engine 122 may provide the feedback to the affinity prediction engine 118. Subsequently, based on the feedback, the affinity prediction engine 118 may determine the revised affinity score for the sender towards the product.

At step 306, new products from the plurality of products are recommended based on the revised affinity score. In an example, the recommendation engine may then receive the revised affinity score and make fresh recommendations based on the revised affinity score.

Thus, the present subject matter provides recommendation to the sender by considering various factors. The systems and the methods of present subject matter consider motivation of exchange, the product psychographic portfolio, the personality traits of the sender and the recipient, relationship type, and business strategies of sellers to make the recommendations.

Example of a Recommendation Management Computer Apparatus

Figure 4:
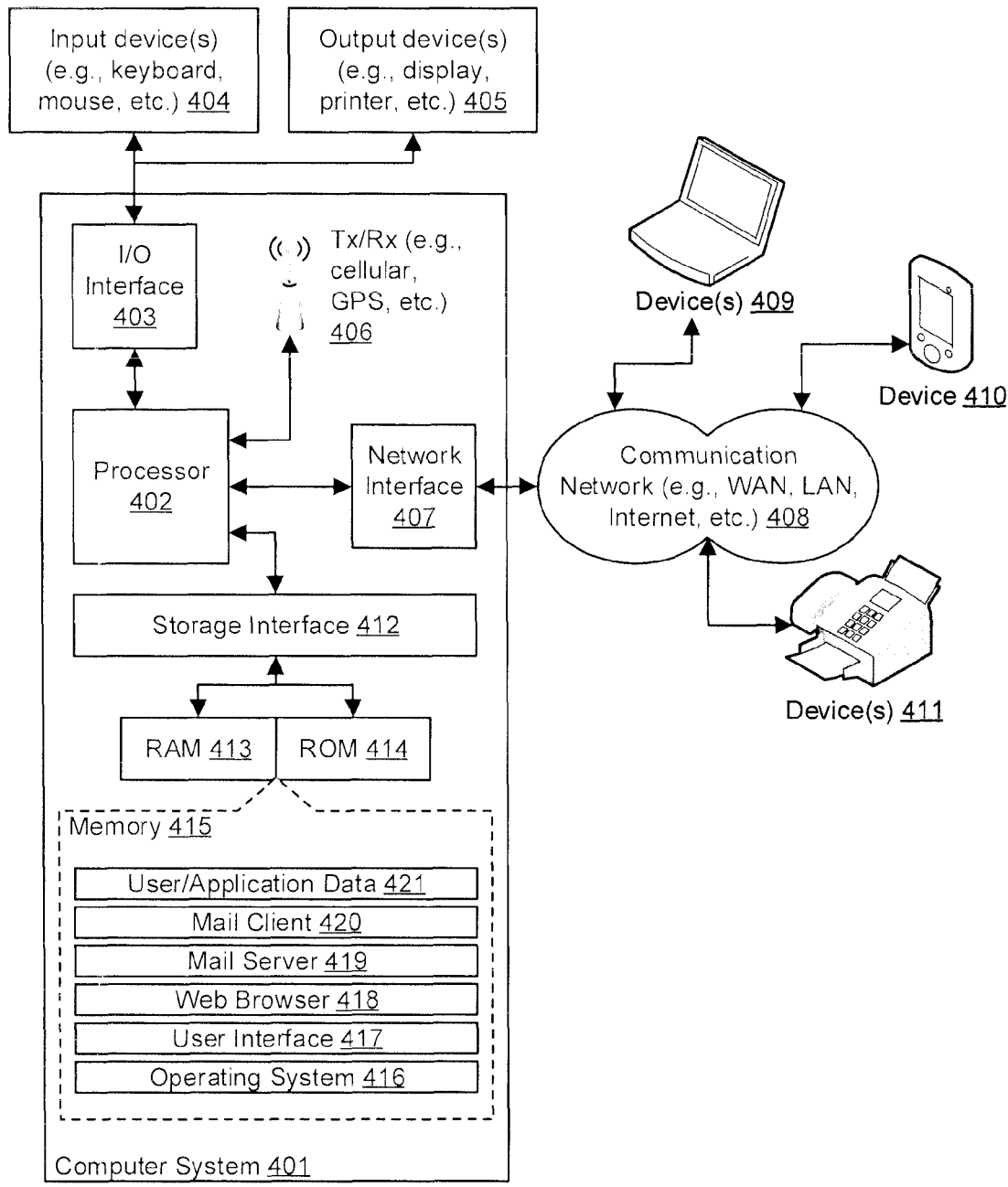
FIG. 4 is a block diagram of an exemplary computer system for implementing embodiments consistent with the present disclosure.

FIG. 4 is a block diagram of an example of a product recommendation computing apparatus 401 for implementing embodiments consistent with the present disclosure. Variations of product recommendation computing apparatus 401 may be used for implementing any of the devices presented in this disclosure. Product recommendation computing apparatus 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some examples may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the product recommendation computing apparatus 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some examples, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some examples, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the product recommendation computing apparatus 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some examples, the product recommendation computing apparatus 401 may itself embody one or more of these devices.

In some examples, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the product recommendation computing apparatus 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the product recommendation computing apparatus 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some examples, the product recommendation computing apparatus 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some examples, the product recommendation computing apparatus 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some examples, the product recommendation computing apparatus 401 may implement a mail client 420 stored program component. The mail client may be a mail viewing application, such as Apple Mail, Microsoft Entourage, Microsoft Outlook, Mozilla Thunderbird, etc.

In some examples, product recommendation computing apparatus 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for providing product recommendations. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more non-transitory computer-readable storage media may be utilized in implementing embodiments consistent with the present disclosure. A non-transitory computer-readable storage medium refers to any type of physical memory on which information or data readable by a processor may be stored. Thus, a non-transitory computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for providing product recommendations, the method comprising:
   determining, by a processor of a product recommendation computing apparatus, personality traits of a sender and a recipient by applying a five-factor model to a plurality of datasets obtained from user data;
   associating, by the processor of a product recommendation computing apparatus, a personality-product score with each of a plurality of products based on the personality traits;
   performing, by the processor of the product recommendation computing apparatus, a need analysis on the user data to determine desired products from the plurality of products;
   determining, by the processor of the product recommendation computing apparatus, a multidimensional collaborative matrix by aggregating the personality traits of the sender and the recipient, the personality-product score, the desired products, and product psychographic portfolio, wherein the product psychographic portfolio comprises a determination of elasticity of affinity toward each of the desired products with respect to the personality traits of the sender and the recipient;
   determining, by the processor of the product recommendation computing apparatus, an affinity score for at least one of the sender and the recipient towards each of the desired products based on the multidimensional collaborative matrix; and
   recommending, by the processor of the product recommendation computing apparatus, at least one product from amongst the desired products to the sender based on the affinity score.

2. The method of claim 1 further comprises
   receiving, by the processor of the product recommendation computing apparatus, a feedback, from the sender, on the at least one product recommended;
   determining, by the processor of the product recommendation computing apparatus, a revised affinity score for the at least one product based on the feedback; and
   recommending, by the processor of the product recommendation computing apparatus, new products from the plurality of products based on the revised affinity score.

3. The method of claim 1, wherein determining the personality traits further comprises:
   receiving, by the processor of the product recommendation computing apparatus, user data, comprising information about the sender and the recipient from at least one data source; and
   segmenting, by the processor of the product recommendation computing apparatus, the user data based on segmentation rules to obtain the plurality of datasets.

4. The method of claim 3, wherein receiving the user data further comprises:
   initializing, by the processor of the product recommendation computing apparatus, configuration settings;
   receiving, by the processor of the product recommendation computing apparatus, the user data from the at least one data source;
   preprocessing, by the processor of the product recommendation computing apparatus, the user data based on the configuration settings;

correlating, by the processor of the product recommendation computing apparatus, data attributes obtained from the at least one data source based on the preprocessing; and analyzing, by the processor of the product recommendation computing apparatus, correlated data attributes to validate the user data.

5. The method of claim 1, wherein the personality-product score indicates correlation of the personality traits with lifecycle stages of the plurality of products.

6. The method of claim 1, wherein the product psychographic portfolio is determined based on a product list and big-five elasticity coefficients, wherein the product list comprises products with high priority in a management information system (MIS), and wherein the big-five elasticity coefficients indicate variation in affinity towards a product with respect to variation in each of the personality traits.

7. The method of claim 1 further comprises monitoring, by the processor of the product recommendation computing apparatus, responses received from the sender and the recipient post-recommendation to improve further recommendations.

8. A product recommendation computing apparatus comprising:
   at least one processor; and
   a memory coupled to the processor which is configured to be capable of executing programmed instructions comprising and stored in the memory to:
      determine personality traits of a sender and a recipient by applying a five-factor model to a plurality of datasets obtained from user data;
      associate a personality-product score with each of a plurality of products based on the personality traits;
      perform a need analysis on the user data to determine desired products from amongst the plurality of products;
      determine a multidimensional collaborative matrix by aggregating the personality traits of the sender and the recipient, the personality-product score, the desired products, and product psychographic portfolio, wherein the product psychographic portfolio comprises a determination of elasticity of affinity toward each of the desired products with respect to the personality traits of the sender and the recipient;
      determine an affinity score for at least one of the sender and the recipient towards each of the desired products based on the multidimensional collaborative matrix; and
      recommend at least one product from amongst the desired products to the sender based on the affinity score.

9. The apparatus of claim 8, wherein the processor coupled to the memory is further configured to be capable of executing at least one additional programmed instruction comprising and stored in the memory to:
   receive a feedback, from the sender, on the at least one product recommended;
   determine a revised affinity score for the at least one product based on the feedback; and
   recommend new products from the plurality of products based on the revised affinity score.

10. The apparatus of claim 8, wherein the processor coupled to the memory is further configured to be capable of executing at least one additional programmed instruction to determine the personality traits comprising and stored in the memory to:

receive user data, comprising information about the sender and the recipient, from at least one data source; and segment the user data, based on segmentation rules, to obtain the plurality of datasets.

11. The apparatus of claim 10, wherein the processor coupled to the memory is further configured to be capable of executing at least one additional programmed instruction to receive the user data comprising and stored in the memory to:
   initialize configuration settings;
   receive the user data from the at least one data source;
   preprocess the user data based on the configuration settings;
   correlate data attributes obtained from the at least one data source based on the preprocessing; and
   analyze correlated data attributes to validate the user data.

12. The apparatus of claim 8, wherein the personality-product score indicates correlation of the personality traits with lifecycle stages of the plurality of products.

13. The apparatus of claim 8, wherein the product psychographic portfolio is determined based on a product list and big-five elasticity coefficients, wherein the product list comprises products with high priority in a management information system (MIS), and wherein the big-five elasticity coefficients indicate variation in affinity towards a product with respect to variation in each of the personality traits.

14. The apparatus of claim 8, wherein the processor coupled to the memory is further configured to be capable of executing at least one additional programmed instruction comprising and stored in the memory to:
   monitor responses received from the sender and the recipient post-recommendation to improve further recommendations.

15. A non-transitory computer-readable medium storing instructions for providing product recommendations that, when executed by a processor, cause the processor to perform operations comprising:
   determining personality traits of a sender and a recipient by applying a five-factor model to a plurality of datasets obtained from user data;
   associating a personality-product score with each of a plurality of products based on the personality traits;
   performing a need analysis on the user data to determine desired products from amongst the plurality of products;
   determining a multidimensional collaborative matrix by aggregating the personality traits of the sender and the recipient, the personality-product score, the desired products, and product psychographic portfolio, wherein the product psychographic portfolio comprises a determination of elasticity of affinity toward each of the desired products with respect to the personality traits of the sender and the recipient;
   determining an affinity score for at least one of the sender and the recipient towards each of the desired products based on the multidimensional collaborative matrix; and
   recommending at least one product from amongst the desired products to the sender based on the affinity score.

16. The non-transitory computer-readable medium of claim 15, further comprising:
   receiving a feedback, from the sender, on the at least one product recommended;
   determining a revised affinity score for the at least one product based on the feedback; and recommending new products from the plurality of products based on the revised affinity score.

17. The non-transitory computer-readable medium of claim 15, wherein the determining the personality traits further comprises:
   receiving user data, comprising information about the sender and the recipient, from at least one data source; and
   segmenting the user data, based on segmentation rules, to obtain the plurality of datasets.

18. The non-transitory computer-readable medium of claim 17, wherein the receiving the user data further comprises:
   initializing configuration settings;
   receiving the user data from the at least one data source;
   preprocessing the user data based on the configuration settings;
   correlating data attributes obtained from the at least one data source based on the preprocessing; and
   analyzing correlated data attributes to validate the user data.

19. The non-transitory computer-readable medium of claim 15, wherein the personality-product score indicates correlation of the personality traits with lifecycle stages of the plurality of products.

20. The non-transitory computer-readable medium of claim 15, wherein the product psychographic portfolio is determined based on a product list and big-five elasticity coefficients, wherein the product list comprises products with high priority in a management information system (MIS), and wherein the big-five elasticity coefficients indicate variation in affinity towards a product with respect to variation in each of the personality traits.

21. The non-transitory computer-readable medium of claim 15, further comprising monitoring responses received from the sender and the recipient post-recommendation to improve further recommendations.

\* \* \* \* \*